Dec. 27, 1955 P. A. WHISLER 2,728,180
FORAGE HARVESTER-QUICK ATTACHMENT CHANGEOVER ARRANGEMENT
Filed Oct. 29, 1952 6 Sheets-Sheet 1

Inventor
Paul A. Whisler
by Kenneth Cluckwell
Attorney

Dec. 27, 1955   P. A. WHISLER   2,728,180
FORAGE HARVESTER-QUICK ATTACHMENT CHANGEOVER ARRANGEMENT
Filed Oct. 29, 1952   6 Sheets-Sheet 3

Inventor
Paul A. Whisler
by Kenneth Tuckwell
Attorney

Fig. 4

Dec. 27, 1955   P. A. WHISLER   2,728,180
FORAGE HARVESTER-QUICK ATTACHMENT CHANGEOVER ARRANGEMENT
Filed Oct. 29, 1952   6 Sheets-Sheet 5

Inventor
Paul A. Whisler
by Kenneth McKiver
Attorney

United States Patent Office 2,728,180
Patented Dec. 27, 1955

2,728,180

FORAGE HARVESTER—QUICK ATTACHMENT CHANGEOVER ARRANGEMENT

Paul A. Whisler, La Porte, Ind., assignor to Allis-Chalmers Manufacturing Company, Milwaukee, Wis.

Application October 29, 1952, Serial No. 317,413

3 Claims. (Cl. 56—2)

This invention relates generally to forage harvesters and is more particularly concerned with and directed toward a design of machine which may readily be adapted for either harvesting crops which are grown in rows, such as corn, or for harvesting crops, such as grasses, which are not grown in rows.

Forage harvesters in the prior art have been equipped with interchangeable grass and row crop units. However, most forage harvesters are of the type having a relatively narrow throat leading into the chopping mechanism and while this type of forage harvester can efficiently handle a row crop, it does not handle a wide swath of grass very efficiently. With this type of forage harvester it is a relatively simple problem to design interchangeable headers for row crops and grasses wherein the base unit includes a floor conveyer for moving the cut crop to the narrow feed throat and this floor conveyer can be utilized for either the row crop unit or grass unit.

Applicant's U. S. Patent 2,651,162 issued on September 8, 1953 for Forage Harvester discloses a type of forage harvester wherein a row crop harvesting attachment and a grass crop harvesting attachment are selectively connectable, one in lieu of the other, with a base unit which is operable to process harvested material delivered to it from either the row crop or the grass crop harvesting attachment. In the harvester of the aforesaid patent a relatively wide chopping cylinder is permanently installed on the base unit, and each of the attachment units, that is, the row crop harvesting attachment as well as the grass crop harvesting attachment, has its own crop cutting and conveying mechanism for supplying harvested material to the wide chopping cylinder of the base unit. The effective width of the grass cutting and conveying mechanism is substantially equal to the width of the chopping cylinder, and the row crop harvesting unit is specially constructed so that the full cutting width of the chopping cylinder is utilized to chop up stalks. The provision of such a row crop unit is not herein claimed as such invention is claimed in applicant's patent aforementioned. However, this invention is concerned with improved means for attaching interchangeable efficient harvesting units to a forage harvester base unit, and more particularly to a base unit of the type having a wide chopping cylinder.

In the use of a forage harvester having a wide chopping cylinder, it is impractical to use the same conveying means for moving cut material from the sickle bar or pickup device to the chopping cylinder for both row crop and grass units by attaching such conveying means to the base forage harvester unit as has been done in the prior art for relatively narrow forage chopping units. It, therefore, becomes necessary to carry such conveying means in the separate row crop and grass units thereby increasing the weight and size of same. These units (row crop and grass) then become of a size somewhat difficult to interchange and the change is laborious and time consuming, particularly if very careful and skilled adjustment is required in substituting one unit for the other.

It is therefore an object of this invention to provide a forage harvester base unit with interchangeable grass and row crop units which units can be readily installed with a minimum of skill.

Another object of this invention is to provide means on a base forage harvester unit for guiding a row crop or grass attachment into properly attached position on such base unit.

A further object of the invention is to provide a convertible forage harvester of the hereinabove outlined character, wherein the attachment units are equipped with permanently installed pivot components which are readily connectable with the base unit for securing the attachment units in detachable up and down swingable relation to the base unit.

A further object of the invention is to provide a convertible forage harvester of the hereinbefore mentioned character wherein a row crop harvesting attachment and a grass crop harvesting attachment are individually equipped with a crop cutting and conveying mechanism, and wherein said crop cutting and conveying mechanisms may remain in assembled condition while the attachments are connected to or detached from the base unit.

Another object of this invention is to provide means for automatically properly aligning units when installing same on a forage harvester.

Another object of this invention is to provide interchangeable units for a forage harvester wherein such interchange of units can be accomplished in a few minutes and without any special skill.

Still another object of this invention is to provide a convertible forage harvester incorporating a base unit including feeding devices and chopping knives and equipped, selectively, either with a grass or with a row crop harvesting attachment readily mountable on said base unit in an improved manner and utilizing the mounting of a rotatable feeding element carried by each attachment as a pivotal support for the attachment.

In addition, another object of the present invention is to provide a forage harvester incorporating a base unit including feeding devices and chopping knives and incorporating a selected one of separate grass and row crop cutting and conveying units, said units including parts constructed and combined for coaction in an improved manner affording advantages as to combinability of the base unit with the grass or row crop units.

And therefore this invention may be considered as comprising the various constructions and combinations, all as hereinafter more fully set forth in the following detailed description and appended claims; reference being had to the drawings, in which:

Figures 1, 5, 6:
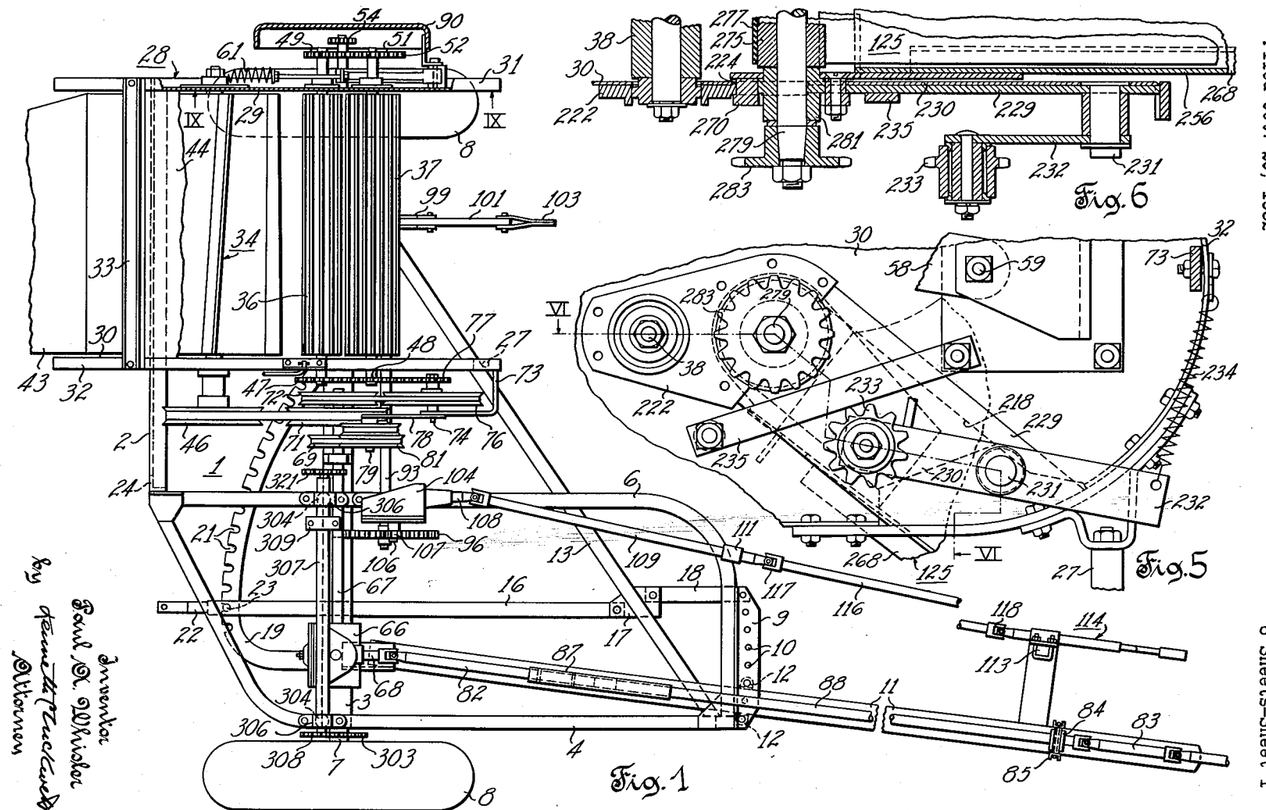
Fig. 1 is a plan view of a mobile base unit embodying the invention with some parts broken away and other parts shown in section.
Fig. 5 is an enlarged portion of Fig. 4 showing the means of attaching the grass cutting and conveying unit to the mobile base unit.
Fig. 6 is a section view on line VI—VI of Fig. 5.
Figures 2, 13:
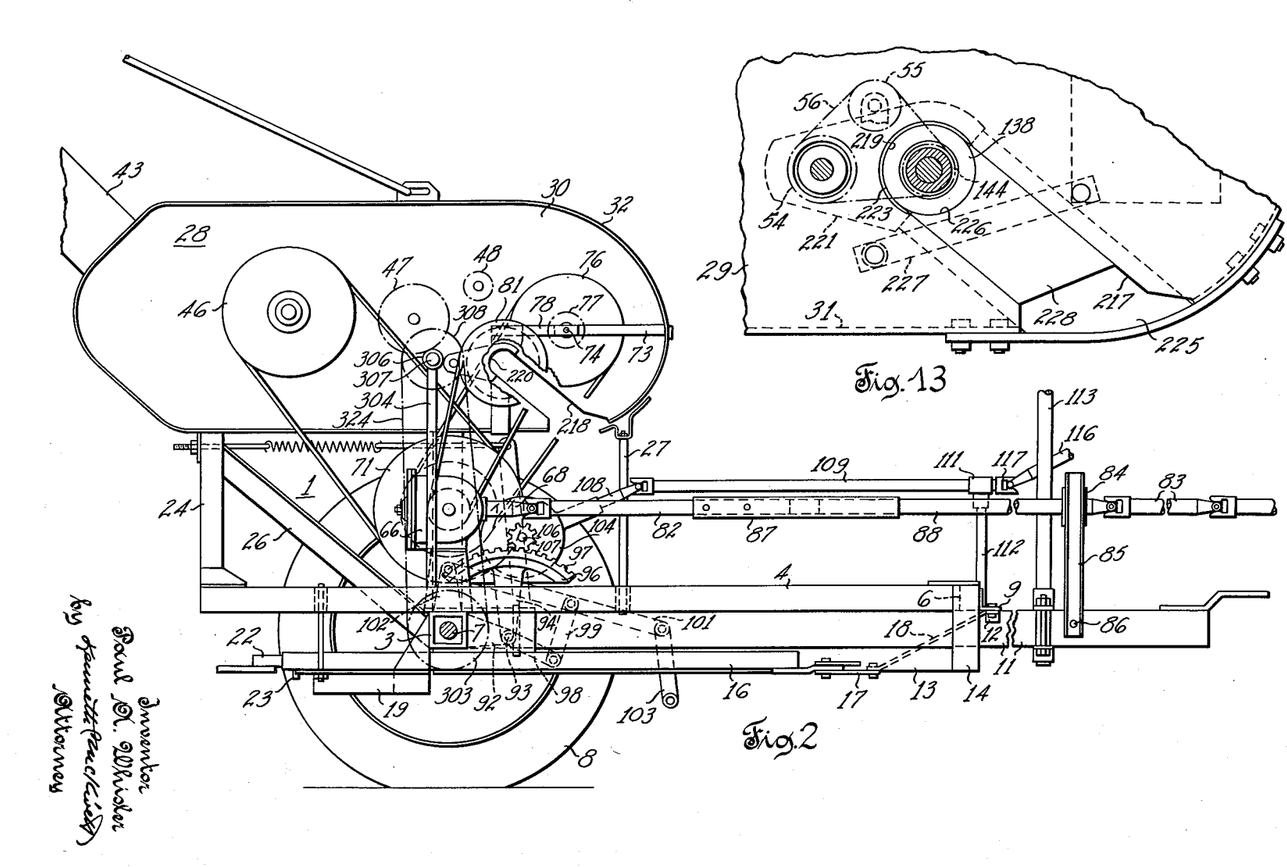
Fig. 2 is an enlarged side view of the unit shown in Fig. 1 with the near side wheel removed.
Fig. 13 is a fragmentary view similar to Fig. 9 with a row crop unit attached to the base unit.

Referring at present to Figs. 1 and 2, it will be seen that the mobile base unit 1 includes a rigid frame structure formed by a pair of transversely disposed parallel members 2 and 3 fixedly united by a number of suitable cross members of which only members 4 and 6 connecting the near end of member 2 with the corresponding end and an intermediate portion of member 3, are shown in the interest of clarity. The opposite ends of member 3 suitably mount oppositely extending and axially aligned spindles 7 which in turn rotatably mount a pair of ground engaging wheels 8. Members 4 and 6 extend forward of member 3 in laterally spaced generally parallel relation, the forward portion of member 6 being of greater length and bent laterally toward and fixedly united with the forward end of member 4 to form a generally U-shaped draft portion. The forward side of member 6 is provided with a bracket 9 having a series of spaced holes 10 therethrough arranged on an arc with respect to a point on rigid member 3 adjacent the near wheel 8. A drawbar 11 has its rear end pivotally attached to member 3 at such point and extends forwardly therefrom immediately beneath bracket 9, the drawbar being provided with a pair of oppositely disposed apertured tabs 12 alignable with pairs of the holes in bracket 9 for the insertion of bolts or the like to fixedly position the drawbar in a selected angular relation with respect to the direction of travel. The forward end of the draft portions of the frame is braced by means of a diagonal member 13 having one end fixedly secured to rigid part 14 depending from the forward portion of members 4 and 6 and having its other end secured to member 3 at a point adjacent the far side thereof.

A draft bar 16 for detachably securing a wagon or the like in trailing relation to mobile unit 1 has its forward end supported for swinging movement about a vertical axis through means of a pivot support bracket 17 secured to the underside of diagonal member 13. Draft bar supporting bracket 17 is further braced by a member 18 fixedly connecting same with the adjacent underside portion of bracket 9. The rear end of draft bar 16 is swingably supported on a rearwardly bowed member 19 having its opposite ends fixedly secured to laterally spaced, underside portions of transverse member 3. The rearwardly facing edge of this bowed member is preferably provided with notches 21 and the rear portion of draft element 16 is provided with a longitudinally telescoping section 22 provided with a depending lug or pin 23 adapted to engage one of the notches in member 19. In the event that a trailing wagon is attached to the end of member 22 and the wagon tends to travel forward at a rate faster than the mobile unit, jackknifing of the wagon relative to the harvester will be prevented by engagement of the pin 23 with one of the notches 21. If desired the telescoping section 22 may be locked in a retracted position by a suitable bolt, not shown, so that the pin and telescoping section are free of the notches thereby permitting the draft member to swing laterally about its front pivot support. The remote side of the main frame, as viewed in Fig. 2, is provided with a plurality of upwardly extending members 24, 26 and 27, the members 24 and 26 being connected in supporting relation to, and the member 27 being connectable at its upper end with a housing 28 in spaced relation with respect to underlying frame members 2, 3 and 13. The housing 28 includes a pair of transversely spaced upright plate members 29 and 30 which form opposite side members, respectively, of the base unit, the plate members 29 and 30 being provided with similar turned over edge portions 31 and 32, respectively, connected by suitable cross members 33 (see Fig. 1) of which only one is clearly shown in the interest of simplicity.

Side plate members 29 and 30 operatively mount therebetween a rotating chopping device or cylinder 34 and, as will be explained more fully hereinbelow, the side plate members 29 and 30 also mount a pair of swingable supports 58 for a pair of upper feed rolls 36 and 37. A lower feed roll 38 (see Fig. 3) is rotatably mounted at its opposite ends on the side plates 29 and 30 and is disposed immediately in advance of the chopping device, the latter coacting with a suitable shear bar 39 to effect a chopping or severing of material fed thereto. In this connection it will be noted that the housing, which substantially encloses the rotary chopping device, is provided with a material receiving opening 41, a material discharge opening 42 communicating with an upward and rearwardly extending spout 43 of which only a portion is shown, and with a cover element 44 (shown partly broken away in Fig. 1) affording access to the top side of the chopping device. The chopping device and feed rolls are suitably mounted for rotation about generally parallel horizontal axes through means of shaft portions and bearing suitably supported in opposed portions of side plates 29 and 30. In this connection it will be noted that side plates 29 and 30 extend forwardly beyond upper feed roll 37 to provide space for receiving an attachment therebetween, as hereinafter described.

The near exposed end of the chopping device shaft fixedly mounts a pulley 46 and the corresponding shaft ends of both upper feed rolls 36 and 37 are provided with sprocket wheels 47 and 48, respectively. The far side shaft ends of both upper feed rolls 36 and 37 are also provided with sprockets 49 and 51, respectively, which are drivingly connected by means of a chain 52 passing therearound and also around a chain tightening sprocket 53 (see Fig. 9). Likewise the far side shaft end of lower feed roll 38 has a sprocket 54 thereon connected to an idler sprocket 55 by means of a chain 56. The bearings supporting the far and near side shaft end portions of upper feed rolls 36 and 37 are adjustably supported through similar means (of which only one is shown see Fig. 9) comprising a detachable element 57 pivotally supported on an intermediate portion of a rigid arm 58 which is in turn supported at one end for vertical swinging movement about a transverse horizontal axis afforded by a pivot support 59, the opposite end of bar 58 being adjustably connected with flange portion 31 of plate 29 (not shown) through a resilient means 61 acting to maintain the upper rolls in a predetermined releasable position relative to the lower roll.

Transverse frame member 3 supports a gear box 66 enclosing and supporting one end of a shaft 67 (see Fig. 1) which extends inward therefrom in parallel relation to member 3, shaft 67 having its gear box enclosed end gear connected with a forwardly disposed stub shaft 68. The inner or far side end of shaft 67 is supported on member 3 and fixedly mounts three axially spaced pulleys 69, 71 and 72 for rotation therewith, pulley 71 being disposed in driving alignment with the pulley 46 on the adjacent end of the chopping device 34. The near forward portion of plate 30 is provided with a bracket 73 rotatably supporting a stub shaft 74 disposed in parallel relation with respect to shaft 67 and with respect to the axes of feed rolls 36, 37 and 38. Shaft 74 mounts a pulley 76 in driven alignment with the pulley 72 on shaft 67 and a sprocket wheel 77 aligned with the sprockets on the adjacent ends on both upper feed rolls 36 and 37. Bracket 73 is provided with a rearward extension 78 which detachably mounts a stub shaft 79 disposed in parallel relation to shaft 67 and stub shaft 74. Stub shaft 79 mounts a dual pulley 81 having one element thereof disposed in driven alignment with the pulley 69 on shaft 67. Power for operating shaft 67 is obtained from a forwardly extending shaft 82 having its rear end universally connected to the forward end of shaft 68 projecting from gear box 66 and having its forward end provided with a universally connected section 83 adapted for connection with the rear end of a tractor power take-off shaft (not shown). Power transmitting shaft 82 has its forward end rotatably supported in a bearing 84 which is in turn supported on a standard 85 pivotally mounted on a forward portion of the drawbar or tongue 11 for fore and aft swinging movement relative thereto. Preferably bearing 84 is mounted on standard 85 which is pivotally attached to tongue 11 by means of a pivot support 86 thereby affording limited pivotal movement of the bearing about a transverse horizontal axis with respect to the tongue 11. Power transmitting shaft 82 comprises telescoping sections 87 and 88 affording longitudinal movement of the forward end thereof relative to the rear portion universally connected with gear box shaft 68.

Referring again to Figs. 1 and 2, it will be seen that an intermediate portion of transverse frame member 3 is provided with a pair of laterally spaced and aligned forwardly projecting rigid brackets 92 mounting a shaft 93 disposed in generally parallel relation to member 3. The near end of shaft 93 is provided with an upwardly extending arm 94 fixed thereto, this arm terminating in a fore and aft arcuate portion 96 provided with gear teeth 97. The opposite end of shaft 93 has an arm 98 fixed to a portion thereof in axially spaced relation to the other supporting bracket 92, the arm 98 extending radially from and being rotatable in unison with the shaft 93, and a link 99 pivotally connects the free end of this arm with an intermediate portion of a lever 101 having its rear end pivotally supported on a bracket structure 102 superimposed on transverse frame member 3. Lever 101 is supported for vertical swinging movement about a horizontal axis generally parallel to member 3 and has its forward or free end provided with a link 103 connectable in supporting relation to the underside of a grass or row crop attachment as will be hereinafter described.

A gear box 104 is mounted on frame member 6 in overlying adjacent relation to the near end of shaft 93 and supports a projecting stub shaft 106 which is parallel to shaft 67 and is provided at its outer end with a pinion 107 meshing with the arcuate rack formed on arm 94. Gear box 104 also rotatably supports a forwardly extending stub shaft 108, it being understood that the gear box enclosed ends of shafts 106 and 108 are suitably connected so that a rotation of shaft 108 imparts a corresponding rotation to shaft 106 and pinion 107 and that the gearing connecting shafts 106 and 108 is so constructed in a well-known manner (and not shown) whereby rotation of shaft 106 takes place only when shaft 108 is rotated. The forward end of shaft 108 is universally connected with a forwardly projecting section 109 rotatably supported in a bearing 111 carried by a standard 112 extending upwardly from a forward portion of frame member 6. The forward portion of tongue 11 is provided with an upwardly extending standard 113 suitably mounting a stub shaft and hand crank assembly 114, the rearward end of this stub shaft being operatively connected with the forward end of shaft 109 by means of an intermediate section 116 and universal joints 117 and 118. In view of the foregoing, it is seen that upon turning the crank, the pinion 107 on stub shaft 106 coacts with the arcuate rack 96 on shaft 93 to impart a turning movement to the latter, thereby effecting a raising or lowering movement, as desired, of the forwardly extending lever 101.

Figures 3, 7, 8:
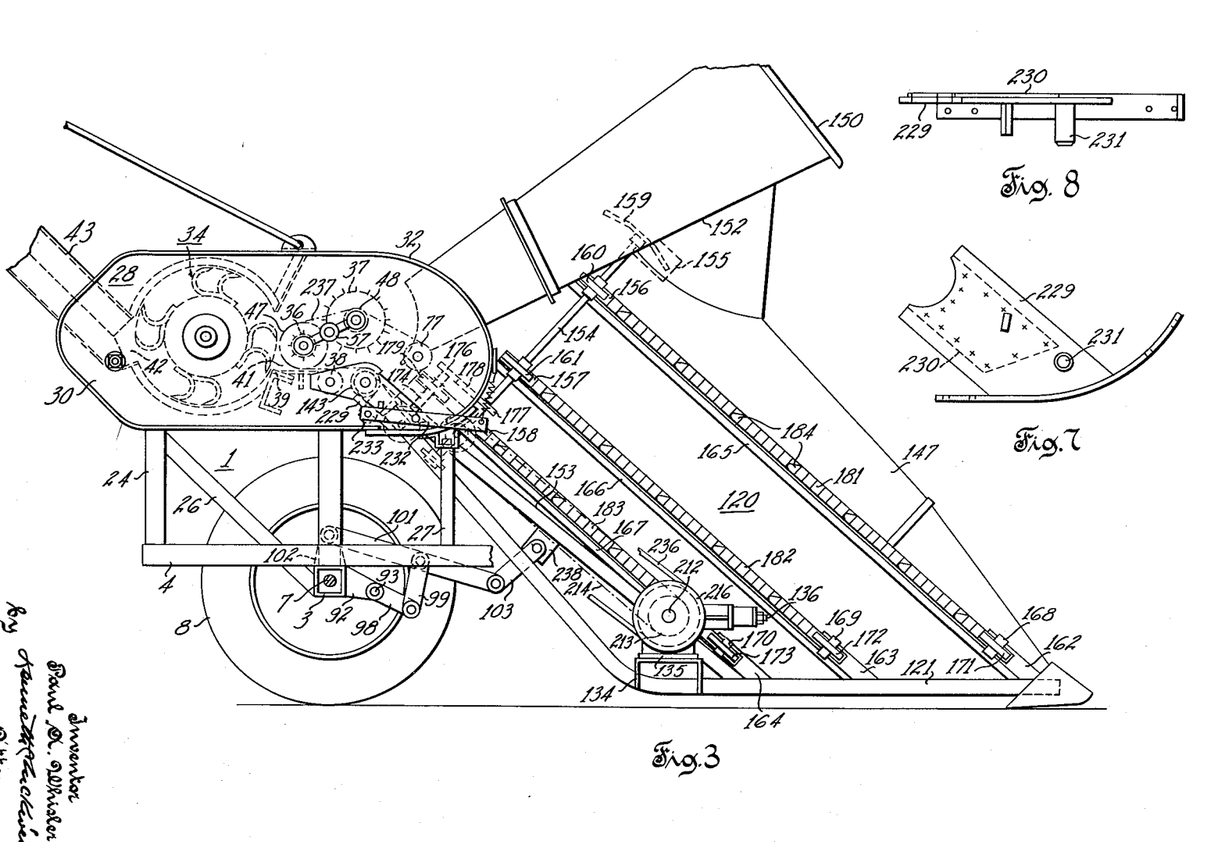
Fig. 3 is a side view of the unit similar to Fig. 2 with a row crop cutting and conveying unit attached and with some parts removed for clarity of illustration.
Fig. 7 is a reduced side elevation of the right hand attaching plate with some parts removed for clarity of illustration.
Fig. 8 is a plan view of the attaching plate shown in Fig. 7.
Figure 11:
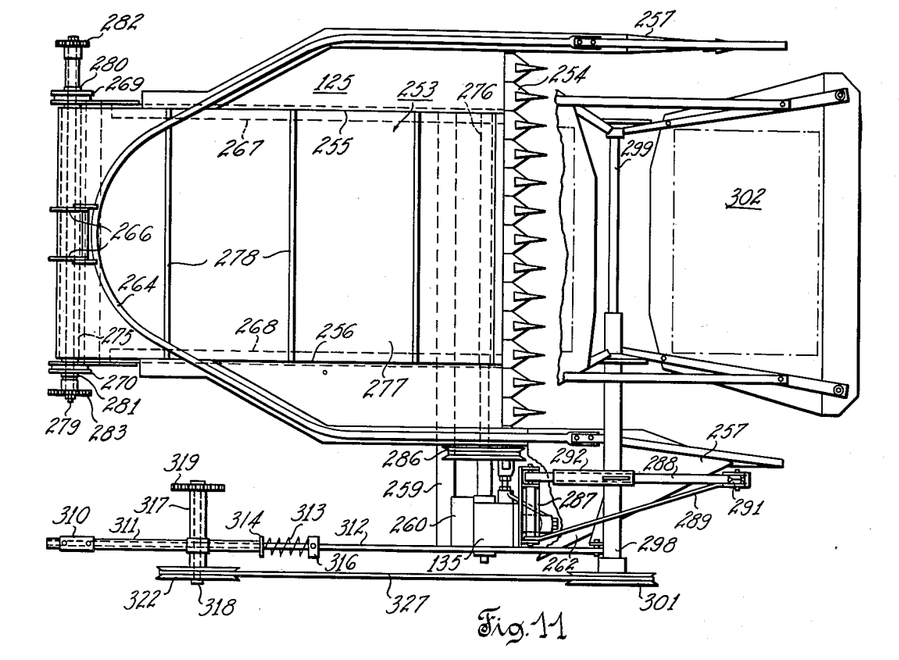
Fig. 11 is a plan view with parts broken away of a grass cutting and conveying unit.
Figure 12:
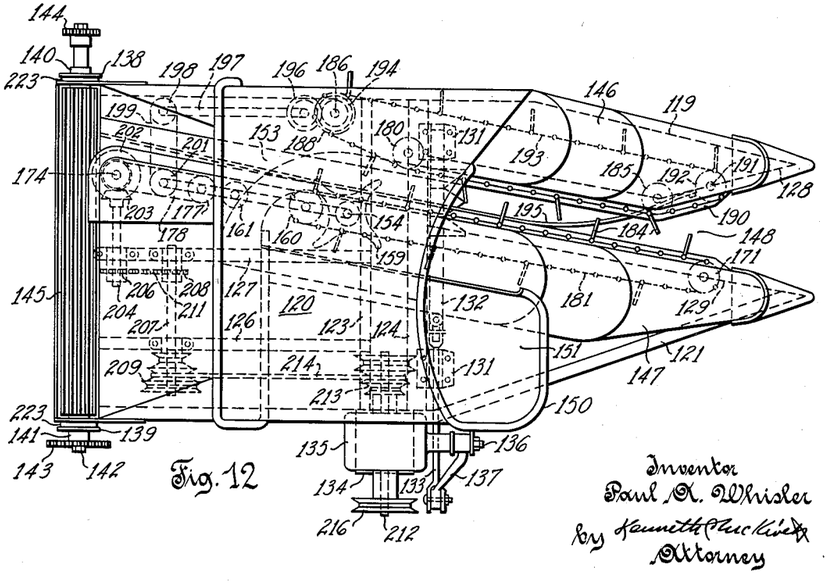
Fig. 12 is a plan view of a row crop unit.

Referring to Figs. 11 and 12, it is seen that either a row crop harvesting attachment 120 or a grass crop harvesting attachment 125 may be installed on the mobile base unit 1. The row crop attachment or unit 120 includes a generally rigid frame structure comprising outer side members 119 and 121 which, as shown in Figs. 3 and 12, have rearwardly diverging horizontal forward portions and rear portions inclined upwardly from the forward portions in parallel relation with respect to each other. The side members 119 and 121 are fixedly united by a plurality of cross members including 123 and 124 and additionally by longitudinally extending members 126 and 127 to form a support on which a crop cutting and conveying mechanism is mounted as will be described more fully hereinbelow. In the installed condition of the row crop unit 120 on the base unit 1 of the harvester, as shown in Fig. 3, the transversely spaced upper rear ends of the side members 119 and 121 extend in overlapping relation to the side plate members 29 and 30 of the base unit. An additional pair of longitudinally extending members 128 and 129 have their rear ends fixedly secured to laterally spaced portions of front cross member 124 and extend forward therefrom in parallel passage forming relation to a point near the front end of the unit whereupon member 128 diverges outwardly and is joined with the forward end of side member 119. Member 129 extends forward from cross member 124 in straight line relation to its junction with the forward end of side member 121. The forward side of cross member 124 carries a pair of laterally spaced brackets 131 operatively supporting a cutter bar and sickle mechanism 132, the near side of the latter being provided with an outwardly extending pitman 133. Near side member 121 is provided with an enlargement or support part 134 immediately to the rear of cross member 124 and a wobble box 135, that is a box containing means for converting rotary motion to oscillating motion, is detachably mounted on this support and presents a forwardly extending oscillating stub shaft 136 on which is secured a depending arm 137 positioned for detachable connection with the adjacent end of pitman 133. The rear ends of side members 119 and 121 are provided with bearing elements in the form of pivot rings 138 and 139, respectively, which support bearing sleeves 140 and 141, respectively, in which is journaled a feed roll shaft 142 having a sprocket 143 on the near end and sprocket 144 on the far end. A rotatable feeder member 145 is attached to shaft 142 for rotation therewith between side members 119 and 121. It should be understood from the description thus far that when the row crop unit is attached to base machine or unit 1 the part of the frame defined by the forward portions of side members 119 and 121, by cross member 124, and by longitudinally extending members 128 and 129, is adapted to rest on the ground or be positioned in adjacent parallel relation to the ground with the rear portion of the frame extending upward and rearward therefrom to its points of support on base unit 1.

The frame structure or support of the row crop unit 120 mounts a pair of sheet metal sections 146 and 147 presenting inner opposed vertical wall portions defining a passage 148 having a forward portion generally conforming with the spacing of frame members 128 and 129 and extending rearwardly and gradually upward from their front ends to a point adjacent the far rear side of the unit. The bottom edges of the opposed passage forming wall portions of sections 146 and 147 are secured to a pair of laterally spaced longitudinally extending frame members (not shown) which extend upward from the front cross member 124 to the rear cross member (not shown) positioned below feed roll 145. Also mounted on the frame of the unit is a chute-like sheet metal section 150 which is joined with the rear edge portions of sections 146 and 147 to form a continuation of passage 148 and provide a laterally offset enlargement 151 thereof affording a downwardly inclined surface 152

(see Fig. 3) on which stalks may be positioned to extend generally transverse of the unit with their butt ends disposed adjacent the far rear side thereof and their tassel ends at the forward rear side of enlargement 151. The spaced opposed wall portions of sections 146 and 147 in advance of frame cross member 124 provide a stalk receiving throat and passage section 148 by means of which the butt ends of standing stalks are guided into severing relation to the sickle or cutter bar 132 as the unit travels along a crop row. In order to afford a support for the butt ends of severed stalks as they are moved rearwardly and upwardly through passage 148, a bottom plate 153 is secured to frame members 129 and which bottom member spans the opening between the lower edges of the inner opposed wall portions of sections 146 and 147.

In order to convey severed stalks in single file through passage 148 and sequentially position the stalks butt end first in chute 151, a shaft 154 is rotatably supported immediately adjacent the outer rear side walls of section 147 this side wall being provided with vertically spaced longitudinally staggered openings 155, 156, 157 and 158. The opening 155 receives a star wheel 159 which is fixed to the top of shaft 154 and the openings 156 and 157 receive sprocket wheels 160 and 161 all of which are secured to shaft 154 for rotation therewith. In addition, the forward portion of this wall is provided with vertically spaced longitudinally staggered openings 162, 163 and 164 which are similar to and aligned with the openings 156, 157 and 158, respectively. A plurality of longitudinally extending members 165, 166 and 167, one being disposed immediately beneath each pair of longitudinally aligned openings, support fixed stub shafts 168, 169 and 170 rotatably mounting sprocket wheels 171, 172 and 173, which project through the associated opening with the wheels 171 and 172 aligned with the sprocket wheels 160 and 161, respectively, on shaft 154, the latter also extending through and being in part supported by members 165, 166 and 167. A short vertically extending shaft 174, which is disposed to the rear of and parallel to shaft 154, extends from a point below the floor 153 of passage 148 upwardly to a point above the lower end of shaft 154, the upper end of shaft 174 being provided with a sprocket 176 aligned with a sprocket 177 secured to a lower end portion of shaft 154. A chain 178 passes around the aligned sprockets on shafts 174 and 154 to establish a driving connection therebetween. A lower portion of shaft 174 mounts a sprocket 179 in position immediately above the floor 153, this sprocket projecting through the lower rear opening 158 in the wall portion of section 147. A stalk gathering and conveying chain passes around each pair of longitudinally aligned sprockets, i. e., a chain 181 passes around sprockets 160 and 171, a chain 182 passes around sprockets 161 and 172 and a chain 183 passes around sprockets 179 and 173. The gathering and conveying chains are each provided with similar stalk engaging flights 184 which project into passage 148 and travel rearwardly therethrough as indicated in Fig. 12. A short vertical shaft 186 is mounted adjacent the upper outer rear side wall of section 146 in generally parallel relation to shaft 154 and mounts a sprocket 188 on the top end thereof in laterally opposed parallel relation to sprocket 160 on shaft 154. The forward passage forming wall portion of section 146 is provided with an opening (not shown) therethrough which is opposite the opening 162 in section 147 and which is longitudinally aligned with the sprocket 188 on the top end of shaft 186. A longitudinally extending member 190, similar to member 165, extends immediately beneath the openings adjacent the forward end of section 147 and adjacent sprocket 188 and at its forward end and mounts a fixed stub shaft 191 which in turn rotatably supports a sprocket wheel 192. A gathering and conveying chain 193 passes around sprockets 188 and 192 and is also provided with flights 184 which project into passage 148 preferably in staggered relation to similar flights on the opposed chain 181. Since the active course of chain 193 does not follow a straight line path, the passage forming side wall of section 146 is provided with two additional openings (not clearly shown) in longitudinal alignment with the aforementioned openings in section 147 and a pair of idler sprockets 180 and 185, which are also mounted on member 190, project through these openings and guidingly engage the active course of chain 193. In order to insure that the stalks are sequentially severed and thereafter move rearwardly in single file toward chute 150, a flat spring element 195 has its forward end secured to frame member 128 at a point adjacent guide sprocket 185 and extends rearward in curved converging relation to the opposite side wall of passage 148, this spring element closely approaching the opposite vertical wall portion of section 147 immediately in advance of cutter bar 132 and extends rearward therealong in overlying relation to lower chain 183 and to a point adjacent the rear edge of section 147.

The upper end of shaft 186 is provided with a gear 194 which is in mesh with a gear 196 on the upper end of a vertically disposed parallel shaft 197 that extends downward to a point below the bottom floor 153. The lower end of shaft 197 is provided with a sprocket wheel 198 and a driving connection is established between shafts 154 and 197 by means of a chain 199 which passes around sprocket 198 and around an aligned sprocket 201 secured to a lower end portion of shaft 154 immediately below the floor of passage 148. The extreme lower end of shaft 174 mounts a bevel gear 202 in mesh with a complementary gear 203 on the adjacent end of a cross shaft 204, the outer or opposite end of shaft 204 mounting a sprocket wheel 206. Another cross shaft 207 is supported on the top side of frame members 126 and 127 in forward vertically spaced parallel relation to shaft 204, shaft 207 mounting a sprocket wheel 208 on its inner end aligned with the sprocket wheel 206 on the adjacent end of shaft 204 and mounting a stepped multiple pulley 209 on its outer end. A chain 211 passes around sprockets 206 and 208 and establishes a driving connection between shafts 204 and 207. Wobble box 135 mounts a shaft 212 which projects from opposite ends thereof and which is positioned in parallel relation to shaft 207. The inner projecting end of shaft 212 mounts a stepped pulley 213 aligned with and complementary to the pulley 209 on shaft 207 and a belt 214 positioned around these pulleys transmits power from the wobble box to shaft 207. The outer projecting end of shaft 212 mounts a pulley 216 likewise alignable with a pulley on the base unit 1.

Figures 9, 10:
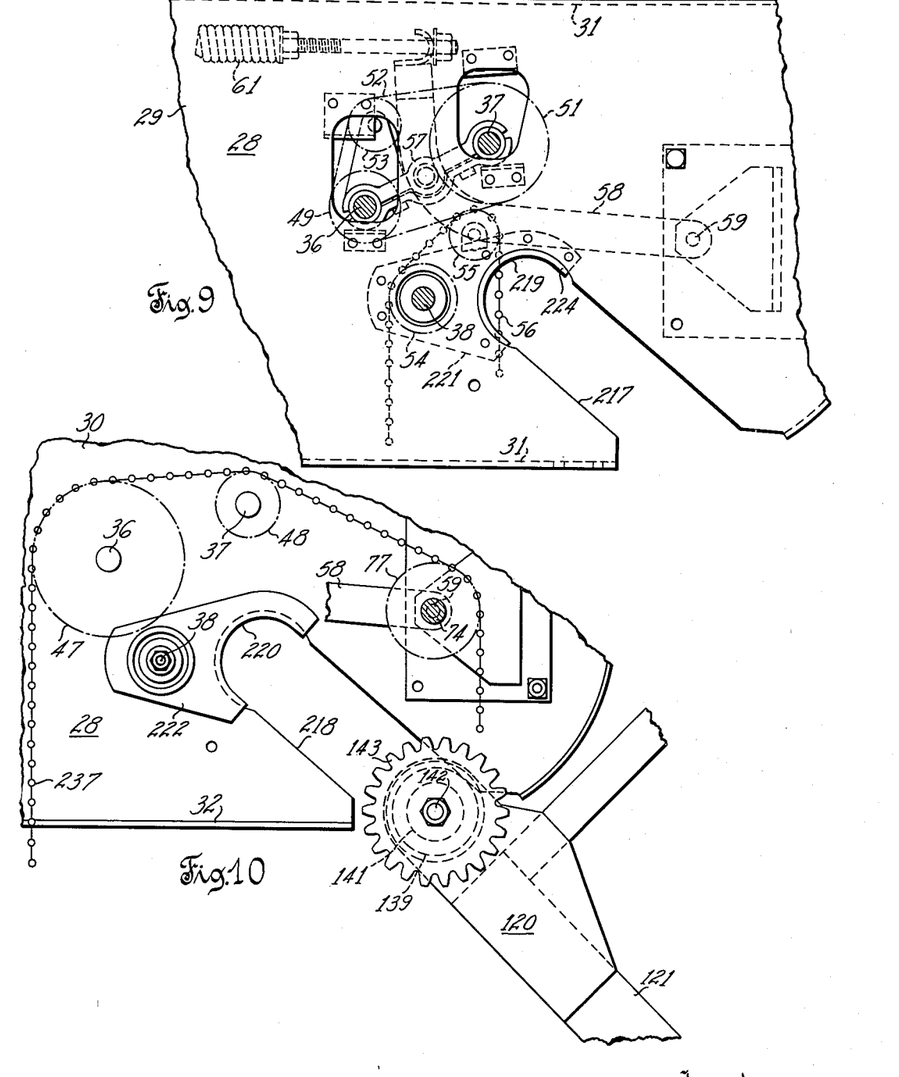
Fig. 9 is an enlarged section view on line IX—IX of Fig. 1.
Fig. 10 is a fragmentary right side view of the base unit showing the manner of attaching the row crop unit thereto.

Referring to Figs. 2, 9 and 10 it is seen that side plates 29 and 30 are provided with similar open ended slots 217 and 218, respectively, therein extending from lower forward edges thereof upwardly and rearwardly and terminating in similarly arcuately shaped pivot mounting surfaces or closed end portions 219 and 220, respectively. Plates 29 and 30 are reinforced adjacent arcuate end portions 219 and 220 by having reinforcing plates 221 and 222, respectively, rigidly attached thereto for the purpose of increasing the effective width of the forwardly and downwardly facing concave bearing surfaces presented by the closed ends of the slots 217 and 218.

Assuming that the row crop unit 120 is to be attached to the base unit 1, previously described, the first step is to remove shield 90 (see Fig. 1) from the far side of housing 28, thereby exposing sprockets 54 and 55 and chain 56, which is shown in detached condition (see Fig. 9). Next the row crop unit 120 is moved rearwardly toward base unit 1 so that pivot rings 138 and 139 may be inserted into slots 217 and 218, respectively, until the upper portion of pivot ring assemblies 138 and 139 are in contact with the closed ends of slots 217 and 218, respectively, which ends present arcuate surfaces complementary to the portion of pivot ring assemblies 138 and 139 which are contacting same. Referring to Fig. 12, it will be noted that pivot rings 138 and 139 are each provided with a similar annular groove 223 and that reinforcing plates 221 and 222 present similar extending portions 224 (see Fig. 6) which extend into the aforementioned grooves thereby preventing transverse movement of the pivot ring assemblies. Plate 225 (see Fig. 13) is then bolted to flange 31 of side plate 29 with upper surface 226 of plate 225 positioned within the annular groove 223 in pivot component support or ring 138 in supporting relation thereto. The upper surface of plate 225 is configured complementary to the surface of pivot ring 138 being contacted. The upper end portions of pivot ring 138 abut the lower portions of reinforcing plate 221 as is indicated in Fig. 13. Strap member 227 is then bolted to side plate 29 in overlying retaining relation to plate 225. Plate 225 is provided with a reinforcing portion 228 rigidly attached thereto and which is adapted to fit into slot 217.

Chain 56 represents a separable, endless flexible power transmitting element, and after it has been connected in power transmitting relation to sprockets 54, 55 and 144, shield 90 is reinstalled on plate 29. Next plate 229 (see Fig. 5) is bolted to flange 32 of side plate 30 at the same time as support 27 is bolted thereto with the upper portion of plate 229 positioned within the annular groove 223 in pivot ring 139 in supporting relation thereto. The upper surface of plate 229 is configured complementary to the surface of pivot ring 139 in the same manner as has been described for plate 225 and plate 229 is also provided with a similar reinforcing plate 230 which fits into slot 218. Attached to bearing retaining plate 229 is a transversely extending pivot pin 231 pivotally mounting a lever 232 rotatably mounting an idler sprocket 233 on one end thereof. A spring 234 carried by plate 30 is attached to the other end of lever 232 biasing sprocket 233 in a counterclockwise direction as viewed in Fig. 5. A strap member 235 is attached to side plate 30 in overlying retaining relation to plate 229. A belt 236 is mounted about pulley 216 on the row crop unit and dual pulley 81 on the base unit to establish an operative connection therebetween. Another separable, endless flexible power transmitting element in the form of a chain 237 is then positioned about sprockets 47, 48, 143, 233 and driving sprocket 77 (as shown in Fig. 3). Link 103 is then attached to bracket 238 carried by floor 153 and the combined base unit and row crop unit is an operable unit when connected to a tractor power take-off.

It should be noted that the plates 225 and 229 represent load transmitting means which are detachably secured to the side plate members 29 and 30, respectively, of the base unit 1 in cooperative engagement with the bearing elements 138 and 139 so as to releasably secure the latter in installed condition within the slots 217 and 218. The bearing elements 138 and 139 are operative in said installed condition to connect the frame structure or support of the row crop unit 120 to the base unit 1 for pivotal up and down movement about a transverse axis which is also the axis of rotation of the feed roll shaft 142. Specifically, the plates 225 and 229 represent retaining means for the bearing elements 138, 139 rotatably associated with the latter and detachably secured to the plate members 29 and 30, respectively, so as to establish the mentioned pivotal connection by cooperative engagement of said retaining means with said bearing elements and by cooperative engagement of the latter with the concave bearing surfaces at the closed ends of the slots 217 and 218, respectively.

Figure 4:
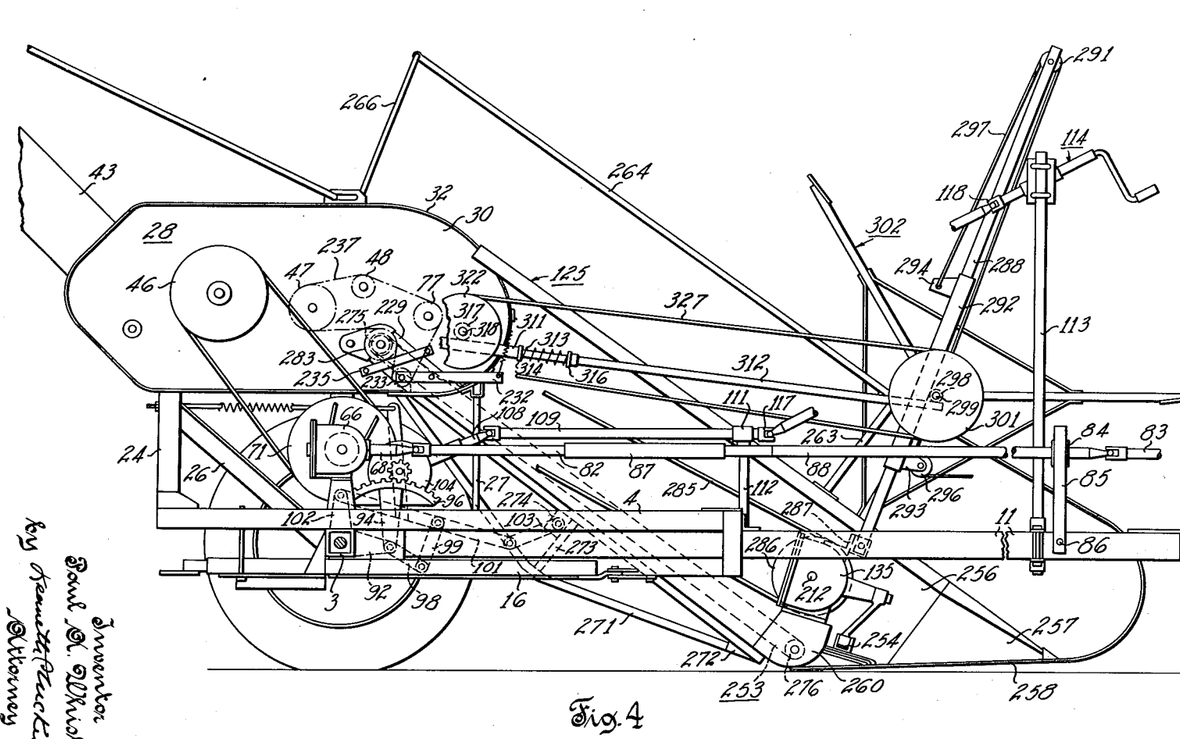
Fig. 4 is a side view of the unit similar to Fig. 2 with a grass cutting and conveying unit attached and some parts removed for clarity of illustration.

Referring to Figs. 4 and 11 it will be seen that a grass attachment unit 125 includes a unitary structure including an endless driven conveyer 253 having an effective width substantially equal to the effective width of the feeding rolls, that is substantially equal to the effective length of rolls 36 and 38, and substantially equal to the effective length of the chopping device 34, and an elongated cutter bar and sickle mechanism 254 disposed immediately in advance of conveyer 253 in laterally symmetrical relation thereto, and including material confining side walls 255 and 256 extending from the rear end of the structure forwardly along opposite sides of conveyer 253 and to points in advance of the opposite ends of cutter bar 254. The forward end portions of side walls 255 and 256 terminate in similar divider points 257 having base or shoe portions 258 adapted to rest on or to be disposed in proximate parallel relation to the ground when the grass unit is attached to unit 1 as hereinafter described. The cutter bar 254 and side walls 255 and 256 are supported in part on a transverse cross member 259 which extends outwardly beyond side wall 256 and presents a tubular bracket like support 260 for a wobble box 135 operatively connected to the cutter bar 254. In order to adequately shield the wobble box, the divider 257 on side wall 256 includes a rearwardly and outwardly flared sheet metal portion 262 which is substantially coextensive with the extension of cross member 259 and with the combined height of the wobble box and support therefor.

A pair of standards 263 extend upward from opposed forward portions of side walls 255 and 256 and support a generally U-shaped rail 264 positioned in spaced overlying relation to the top edges of the side walls. The opposed forward end portions of this rail curving downward and rearward beneath and being secured to the bottom edge of divider points 257 in skid or runner relation thereto. The rear portion of rail 264 carries a connector including a pair of bars 266 pivotally attached thereto and depending therefrom in spaced parallel relation with respect to each other, these bars having their remote ends united and presenting portions attachable to the top side of base unit housing 28. The unitary structure also includes generally parallel similar side frame members 267 and 268 united by cross member 259 and by additional cross members (not shown). A grass cutting and conveying mechanism which will be described in detail hereinbelow is operatively mounted on the rigid frame structure or support including the transversely spaced side members 267, 268, and in the installed condition of the grass crop harvesting unit 125 on the base unit 1, as illustrated in part by Fig. 6, the side members 267, 268 extend in overlapping relation to the upright plate members 29, 30 of the base unit. Like the side members 119, 121 of the row crop harvesting unit 120, the side members 267, 268 of the grass crop harvesting unit 125 mount at their rear ends, a pair of bearing elements in the form of pivot rings 267, 270, respectively, which are similar to the corresponding pivot rings of the row crop unit even as to spacing and configuration. The underside of the unitary structure is additionally braced by means of a downwardly bowed longitudinal member 271 having its opposite ends connected with a rear cross member (not shown) and with transverse cross member 272, and by means of a vertically disposed member 273 fixedly uniting the midportion of bowed member 271 with a corresponding part of the floor structure. The rear side of vertically disposed member 273 mounts a pivot support 274 adapted for connection with the forward end of link 103 on lever 101. The conveyer 253 includes a lower roll 276 supported in bearing structures (not shown) mounted on opposed forward portions of side members 255 and 256 immediately to the rear of cutter bar 254. An endless element 277 which carries transverse raddle bars 278, passes around the roll 276 with its active and inactive courses traveling, respectively, above and below a floor structure (not shown) carried between side members 267 and 268. The upper end of endless element 277 is supported about and driven by a hollow cylinder 275 which is attached to a midportion of shaft 279 journaled in bearing sleeves 280 and 281 carried, respectively, by bearing elements or pivot rings 269 and 270 which are rigidly attached to side members 267 and 268, respectively. A pair of sprockets 282 and 283 are attached to the far and near ends, respectively, of shaft 279.

A forward side of wobble box 135 mounts a transverse bracket 287 which in turn supports a pair of upwardly converging members 288 and 289 for fore and aft swinging movement about a transverse horizontal axis, the upper ends of these members being fixedly joined and support a pulley 291. Member 288 mounts an elongated intermediate sleeve element 292 slidable longitudinally thereof and provided (see Fig. 4) with forward and rearward facing projections 293 and 294 adjacent the lower and upper ends thereof, respectively. Projection 293 mounts a pulley 296 in line with pulley 291 and projection 294 has one end of a rope or cable 297 attached thereto which passes upward therefrom and over pulley 291 and then down and around pulley 296, it being understood that the forward end of rope 297 is secured to a support (not shown) preferably positioned to be within easy reach of the operator's station on a propelling vehicle (not shown). Sleeve 292 fixedly mounts a transversely disposed sleeve 298 which in turn rotatably supports a transversely extending shaft 299 having a pulley 301 fixed on the near end thereof for rotation therewith and having a reel 302 fixedly carried thereon, the reel being thereby disposed in operative overlying relation with respect to the cutting mechanism 254. Referring also to Figs. 1 and 2, it will be seen that the hub portion of near side ground wheel 8 mounts a sprocket 303 and that the opposed rear portions of frame members 4 and 6 support a pair of laterally aligned vertically extending standards 304 which in turn support bearings 306 mounting a cross shaft 307, generally parallel to frame member 3 and to power input shaft 67. A sprocket wheel 308 is positioned on the near end of shaft 307 in alignment with wheel hub sprocket 303 and an intermediate portion of this shaft mounts a laterally fixed pivot support 309 which in turn is adapted to mount therein the rear end element 310 of a forwardly extending laterally rigid member including rear and front telescoping sections 311 and 312, respectively (see Fig. 11), a separation of which telescoping members is resisted by a stiff tension spring 313 having its opposite ends fixed to collars 314 and 316 which are in turn fixed to adjacent portions of sections 311 and 312, respectively. The forward end section 312 is pivotally attached to the transverse sleeve 298 carried by member 292 and is operative to maintain members 288 and 289 and sleeve 298 in a predetermined position and yet permit the height of the reel to be adjusted readily through means of rope 297. A rear portion of section 311 carries a fixed part 317 which in turn rotatably supports a cross stub shaft 318 disposed in overlying relation to section 311, stub shaft 318 being disposed in forwardly spaced parallel relation to cross shaft 307 and mounts a sprocket wheel 319 on its inner end alignable with a sprocket wheel 321 on the adjacent end of shaft 307 (see Fig. 1). The near end of stub shaft 318 mounts a pulley 322 disposed in alignment with the pulley 301 on the end of reel shaft 299.

When it is desired to attach the grass harvesting unit 125 to the base unit 1 in place of the row crop unit 120 attached thereto as previously described, the lift mechanism is actuated to position the forward end of the row crop unit on the ground and the link 103 on lever 101 is disconnected from the underside support bracket 238, shield 90 is removed from the far side of the machine, chain 56 is removed from sprockets 54, 55 and 144. Belt 236 is removed from about pulley 216 and dual pulley 81. Chain 237 is removed from about sprockets 47, 48, 143, 233 and driving sprocket 77. Straps 227 and 235 are then removed from plates 29 and 30, respectively, and plates 225 and 229 are unbolted and removed from side plates 29 and 30, respectively. Row crop unit 120 may now be removed from the base unit 1 by moving the row crop unit 120 relative to the base unit 1 so as to slide pivot rings 138 and 139 downwardly and forwardly out of the open ends of slots 217 and 218, respectively.

The next step is to position the rear end of the grass unit between the spaced forward portions of side walls 29 and 30 and to insert pivot rings 269 and 270 into slots 217 and 218, respectively, and move the grass unit relative to and toward the base unit 1 until the pivot rings are seated in the closed ends of the slots. Plates 225 and 229 are then bolted to the flanges of plates 29 and 30 in supporting relation to pivot rings 269 and 270, respectively, and strap members 227 and 235 are attached to plates 29 and 30 in overlying retaining relation to plates 225 and 229, respectively. Chain 56 is then reconnected about sprockets 54, 55 and 282 and shield 90 is replaced. Chain 237 is then reconnected about sprockets 47, 48, 233, 283 and driving sprocket 77.

The grass unit is now pivotally attached to the base unit through coaction of pivot rings 269 and 270 with the concave bearing surfaces of the closed ends of the slots 217, 218 and through coaction of the pivot rings 269 and 270 with the bearing retaining plates 225 and 229, respectively, exactly in the same manner as described with respect to the row crop unit, and all that remains to be done in order for the grass unit to be supported on the base unit for movement therewith is to attach the link 103 on lever 101 to pivot support 274 on the underside of the grass unit and connect belt 285 about pulley 286 attached to shaft 212 of wobble box 135 and about dual pulley 81. By connecting telescoping section member 310 to pivot support 309 and by placing a chain 324 around sprockets 303 and 308, a chain (not shown) around sprockets 319 and 321, and a belt 327 around pulleys 301 and 322, the reel will be driven at a speed of rotation proportional to the rate of travel. Bars 266 are then attached to an upper portion of housing 28.

It should be noted that the row crop harvesting attachment 120 as well as the grass crop harvesting attachment 125 is provided with an individual, self-contained, crop cutting and conveying mechanism, and that in each instance the crop conveying mechanism includes a rotatable shaft on the attachment frame whose axis coincides with the axis on which the attachment is pivotally adjustable up and down relative to the base unit when installed on the latter. In the case of the row crop harvesting attachment such shaft is represented by the feed roll shaft 142 which is rotatably mounted in the bearing rings 138 and 139, and in the case of the grass crop harvesting attachment such shaft is represented by the upper conveyer drive roll shaft 279 which is rotatably mounted in the pivot rings 269 and 270. As a result of this construction and of the herein disclosed detachable pivot connection involving the slots 217, 218, the time and labor for installing either attachment in lieu of the other on the base unit is greatly reduced. When the row crop harvesting unit is substituted for the grass crop harvesting unit a great deal of the apparatus for driving the reel can be left on the base unit. For example, it is only necessary to remove the chain around sprockets 319 and 321 and unfasten member 310 at pivot support 309 and the remaining reel drive apparatus can be left on the base unit as it will not interfere with the operation of the row crop attachment.

While no explanation has been given as to the operation of the row crop unit and the grass harvesting unit, it is believed that such operation would be apparent to one skilled in the art and as the present invention is principally concerned with means for readily changing over from one unit to the other it is believed that such explanation is not necessary herein.

It should be understood that it is not intended to limit the invention to the particular elements herein shown and described for purposes of illustration as various modifications within the scope of the appended claims may occur to persons skilled in the art.

It is claimed and desired to secure by Letters Patent:

1. In a forage harvester of the type wherein a row crop harvesting attachment and a grass crop harvesting attachment may be interchangeably installed on a base unit operable to process harvested material delivered to it from either of said attachments, the combination of a pair of transversely spaced upright plate members forming opposite side members, respectively, of said base unit and each having a slot extending rearwardly and upwardly from a lower edge portion thereof, said slots being open at said lower edge portions and having closed ends presenting bearing surfaces, respectively, on said plate members; a support for a crop cutting and conveying mechanism having transversely spaced side members in overlapping relation to said plate members, respectively; a pair of bearing elements operatively mounted, respectively, on said side members of said support and proportioned so as to be movable into and out of said slots by back and forth movement of said support and base unit relative to each other; load transmitting means detachably secured to said plate members, respectively, in cooperative engagement with said bearing elements so as to releasably secure the latter in installed condition within said slots, said bearing elements being operative in said installed condition to connect said support to said base unit for pivotal up and down movement about a transverse axis; and crop conveying means operatively mounted on said support and including a shaft mounted in said bearing elements for rotation relative thereto.

2. A forage harvester as set forth in claim 1 and further comprising a lower feed roll extending between and rotatably mounted on said plate members of said base unit rearwardly of and in proximity to said transverse axis, means for transmitting driving power to said shaft including a driving element rotatably mounted on said base unit and a separable, endless, flexible power transmitting element in cooperative engagement with said driving element and with a driven element on said shaft, and means including another separable, endless, flexible power transmitting element for connecting said lower feed roll in driven relation with said shaft.

3. In a forage harvester of the type wherein a row crop harvesting attachment and a grass crop harvesting attachment may be interchangeably installed on a base unit operable to process harvested material delivered to it from either of said attachments, the combination of a pair of transversely spaced upright plate members forming opposite side members, respectively, of said base unit and each having a slot extending rearwardly and upwardly from a lower edge portion thereof, said slots being open at said lower edge portions and having closed ends presenting forwardly and downwardly facing concave bearing surfaces, respectively, on said plate members; a support for a crop cutting and conveying mechanism having transversely spaced side members in overlapping relation to said plate members, respectively; a pair of bearing elements rigidly secured, respectively, to said side members of said support and presenting annular external load transmitting surfaces in rotatable, cooperative engagement with said concave bearing surfaces of said plate members, said bearing elements being movable into and out of said slots by back and forth movement of said support and base unit relative to each other; retaining means for said bearing elements rotatably associated with the latter and detachably secured to said plate members, respectively, so as to establish a pivotal connection between said support and said plate members on a transverse axis by cooperative engagement of said retaining means with said bearing elements and by cooperative engagement of the latter with said bearing surfaces of said plate members; and crop conveying means operatively mounted on said support and including a shaft mounted in said bearing elements for rotation relative thereto on said transverse axis.

References Cited in the file of this patent
UNITED STATES PATENTS

| | | |
|---|---|---|
| 729,356 | King et al. | May 26, 1903 |
| 1,457,424 | Bunch | June 5, 1923 |
| 1,539,529 | Wilkinson | May 26, 1925 |
| 1,727,616 | Pro | Sept. 10, 1929 |
| 2,253,633 | Lindly | Aug. 26, 1941 |
| 2,424,171 | Huddle | July 15, 1947 |
| 2,431,477 | Hill | Nov. 25, 1947 |